United States Patent

Smith et al.

[15] 3,704,426

[45] Nov. 28, 1972

[54] PHASE LOCKED DETECTOR SYSTEM

[72] Inventors: William C. Smith, 67 Cuesta Vista Drive, Monterey, Calif. 93940; James A. Rauth, 5172 Tripoli Avenue, Los Alamitos, Calif. 90720

[22] Filed: March 22, 1971

[21] Appl. No.: 126,760

[52] U.S. Cl. ....................329/122, 325/419, 329/50, 329/138, 331/23

[51] Int. Cl. ....................H03d 3/24

[58] Field of Search ..329/50, 122, 137, 138; 331/18, 331/23, 25, 179; 325/320, 346, 419

[56] References Cited

UNITED STATES PATENTS

| | | | |
|---|---|---|---|
| 3,564,434 | 2/1971 | Camenzind et al. | 329/122 |
| 3,167,719 | 1/1965 | Haeppner | 329/138 X |
| 2,462,759 | 2/1949 | McCoy | 329/122 X |
| 3,123,823 | 3/1964 | Schreitmueller | 325/419 UX |
| 3,221,260 | 11/1965 | Henrion | 325/419 X |

OTHER PUBLICATIONS

Swartz "Variable Frequency Oscillator" IBM Technical Disclosure Bulletin Vol. 13, No. 8, pp. 2446–2447, Jan. 1971

*Primary Examiner*—Alfred L. Brody
*Attorney*—R. S. Sciascia and D. B. Curry

[57] ABSTRACT

A detector system for processing binary information contained in the carrier signal transmitted by the phase shift keying technique. The received carrier signal is applied to the input of a phase shift discriminator where it is compared with the output signal of a reference oscillator. The phase shift discriminator provides a D.C. output signal the level of which is dependent upon the out of phase relationship between the carrier signal and the reference signal. The reference oscillator is responsive to this D.C. signal and is initially frequency locked to the carrier signal and then phase locked to the carrier signal. The binary information is also contained in the level of the D.C. signal and is applied to a binary signal response device such as a teletype machine.

4 Claims, 3 Drawing Figures

INVENTORS
WILLIAM C. SMITH
JAMES A. RAUTH
BY Charles E. [signature]
ATTORNEY

PHASE LOCKED DETECTOR SYSTEM

The invention described herein may be manufactured and used by or for the Government of the United States of America for governmental purposes without the payment of any royalties thereon or therefor.

The present invention relates to a detector system and more particularly to a detector system for processing binary information contained in the carrier signal transmitted by the phase shift keying technique.

One method of transmitting binary information is by a method commonly referred to as Phase Shift Keying (PSK). Systems using this technique usually employ a bi-phase sinusoidal wave form to indicate the binary information which is then transmitted. It should be noted that the bi-phase sinusoidal wave form may be frequency multiplexed on a single sideband channel to allow multichannel use of a high radio frequency. The phase shifting is achieved by frequency shifting audio tones which are frequency multiplexed within a frequency band and transmitted on a single sideband high radio frequency.

Presently there are four basic methods of transmitting binary information by Phase Shift Keying. One of these is referred to as Differential Phase Shift Keying. In this system the same tone or frequency serves as signal and reference. The phase during one band serves as a reference for the preceding band. Another is referred to as the Adjacent Tone Reference PSK System. This is a system in which a reference tone is transmitted at an adjacent frequency simultaneously with the keyed tone. At the receiver, the phase of the reference is adjusted to compensate for the frequency difference between the reference and the keyed tone. Still another system is referred to as the Quadrature Reference PSK System. In this system the phase of one quadrature component is keyed while the other serves as a reference tone. The fourth system is referred to as the Decision Directed Measurement PSK System. This system reconstructs a reference tone by aligning the phases of successive bands based on the already concluded decisions.

The various Phase Shift Keying Systems were derived to provide synchronization between the transmitter and the receiver which is necessitated by random fluctuations of the carrier phase and/or frequency due to the multi-path fading phenomenon and by the Doppler effect. To provide this synchronization it has been necessary and difficult to generate the proper local phase at the receiver. The receiver equipment for achieving this has been very complex and expensive.

An object of the present invention is to detect a departure in phase of a sinusoidal waveform containing digital logic which will be suitable for teletype or other binary responsive devices.

Another object is to provide a phase shift detector that is simple, inexpensive, reliable, and effective.

Briefly, the present invention comprises a detector system for processing binary information contained in the carrier signal transmitted by the phase shift keying technique. The received carrier signal is applied to the input of a phase shift discriminator which provides a D.C. output signal depending upon the out-of-phase relationship between the incoming signal and locally generated reference signal. A reference oscillator is provided which is voltage controlled by the D.C. output signal of the phase shift discriminator. The A.C. output of the reference oscillator is connected to the transformer secondary circuit of the phase shift discriminator where it is compared with the incoming A.C. signal carrying the binary information. Since the reference oscillator is responsive to the D.C. level of the phase shift discriminator and since the D.C. level is determined by the out-of-phase relationship between the carrier signal and the reference oscillator signal, the reference oscillator is then phase locked to the carrier signal. The binary information is also obtained from the D.C. level of the phase shift discriminator. A received phase shifted binary signal, when changing from Mark to Space or vice versa, or when changing from one logic level to another, has a distinct or large out-of-phase relationship with the reference oscillator and therefore results in a large D.C. spike which is sensed by a trigger circuit the output of which is used to actuate a binary signal responsive device such as a teletype machine.

Other objects, advantages and novel features of the invention will become apparent from the following detailed description of the invention when considered in conjunction with the accompanying drawings wherein.

Figure 1:
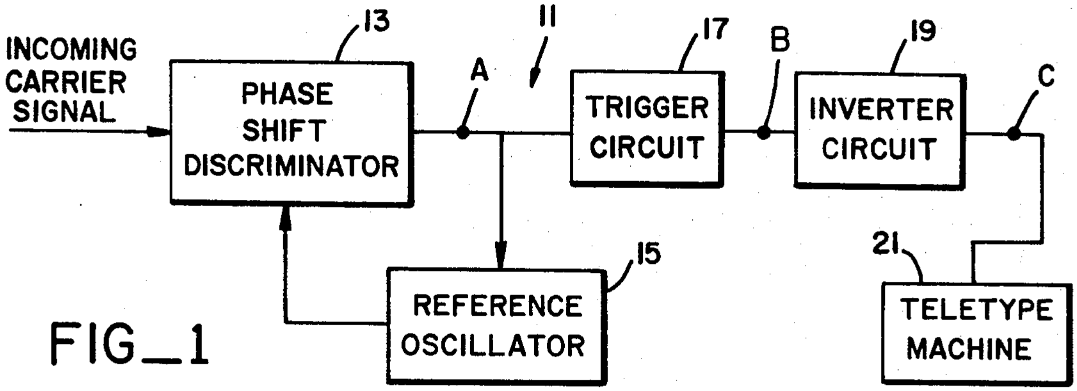
FIG. 1 is a block diagram of the detector system of the present invention.

In FIG. 1 is illustrated by block diagram the detector system 11 of the present invention. The incoming carrier signal contains binary information which has been transmitted by the phase shifting keying technique. The incoming carrier signal is applied to the input of the phase shift discriminator 13 the output of which is applied to the inputs of reference oscillator 15 and trigger circuit 17. The output of reference oscillator 15 is applied as a feedback control signal to phase shift discriminator 13 for comparison with the incoming carrier signal. The output of trigger circuit 17 is applied to inverter circuit 19 the output of which is applied to the input of teletype machine 21. The incoming signal is compared in phase shift discriminator 13 with the output signal from reference oscillator 15. If there is a phase difference then phase shift discriminator 13 provides a D.C. output that changes the frequency of reference oscillator 15 such that it matches the frequency and phase of the incoming signal. That is, if the incoming signal changes phase, then the reference oscillator changes to follow and will establish a new constant phase relationship. This is a floating reference phase and permits the reference oscillator to shift its frequency and phase to allow for the shift in phase of the incoming signal due to Doppler effects or any other phase changing factors in the transmission path.

Figure 2:
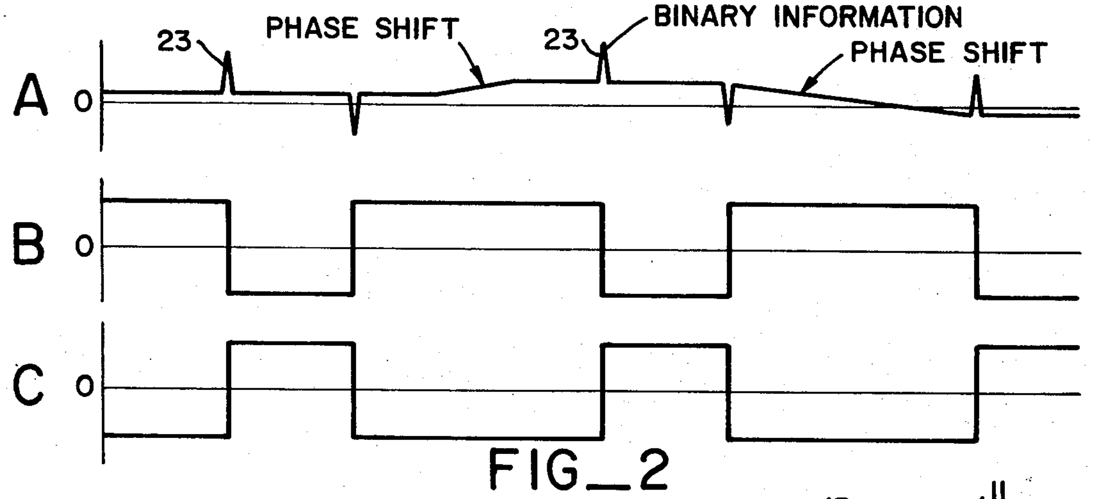
FIG. 2 is a group of three curves illustrating the operation of the detector system of FIG. 1.

In FIG. 2 are shown curves A, B, and C which respectively correspond to typical signals that may appear at points A, B, and C of FIG. 1. Curve A of FIG. 2 is the output signal from phase shift discriminator 13 and shows a series of binary information signals 23 and random phase shifts as indicated on the drawing. These illustrated phase shifts represent those typically encountered as a result of the Doppler effect or other phase changing factors in the transmission path of the incoming signal.

Curve B of FIG. 2 shows the information pulse train at point B of FIG. 1 containing binary signals from trigger circuit 17. These signals are uniformly above and below a zero reference point. Curve C represents the positive and negative D.C. signals produced by inverter 19 in response to the signals from trigger circuit 17. These D.C. keying signals are then used to actuate a binary signal responsive device such as teletype machine 21.

Figure 3:
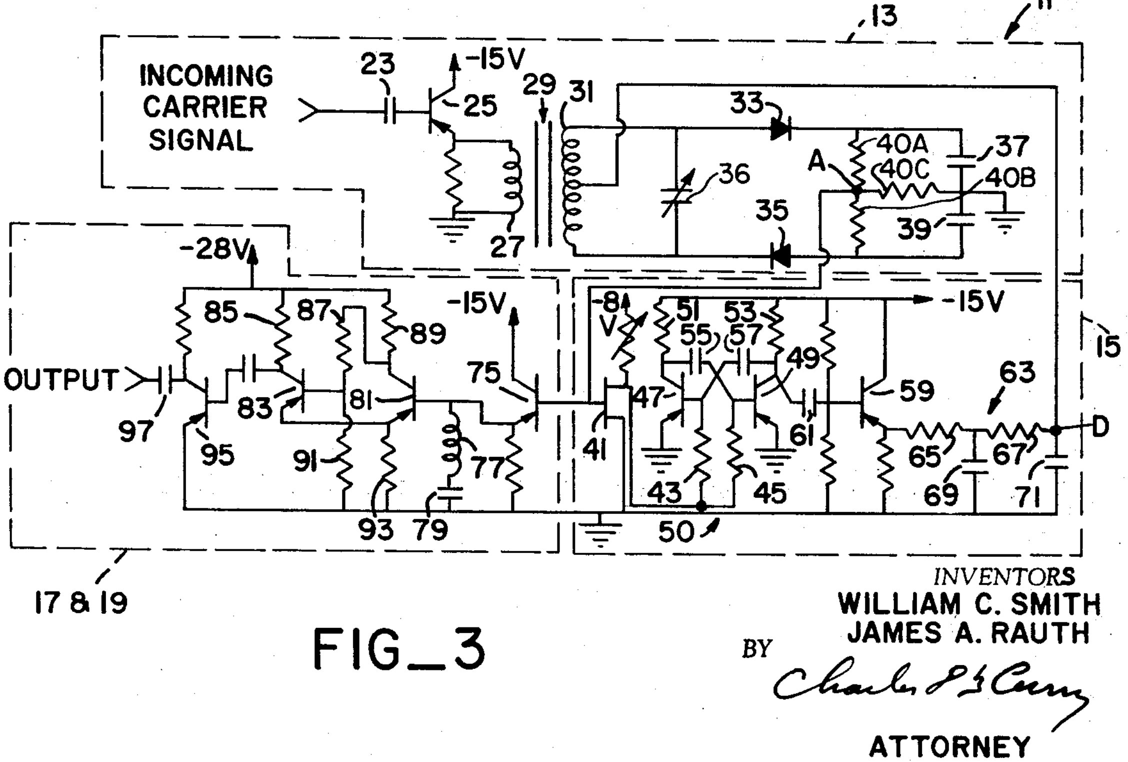
FIG. 3 is a detail schematic drawing of the detector system FIG. 1.

In FIG. 3 is illustrated the detailed circuit of detector system 11 of FIG. 1. The incoming signal is applied through capacitor 23 to the base of emitter following transistor 25 and appears as an amplified incoming signal across primary winding 27 of transformer 29. The secondary winding 31 has one end connected to the anode of diode 33 and the other end to the cathode of diode 35. Variable capacitor 36 is connected across the secondary winding to provide variable tuning. Diodes 33 and 35 are connected to capacitors 37 and 39 resistors 40A, 40B and 40C as shown. Oscillator 15 provides a filtered sinusoidal A.C. signal at point D of FIG. 3. This sinusoidal A.C. signal from reference oscillator 15 is applied to the center tap of secondary winding 31 of transformer 29.

The operation of the phase-shift discriminator circuit 13 is as follows. The incoming signal and the signal from the reference oscillator are compared in secondary winding 31 of transformer 29. The tuned secondary developes a strong signal in phase (between the center tap and one end of the secondary winding) and 180° out of phase (between the center tap and the other end of the secondary winding) with respect to the input of the primary which, when combined with the reference signal, comprises the signal voltages applied across diodes 33 and 35. Since the center of capacitors 37 and 39 are at ground potential, a D.C. potential will be developed at point A which will vary depending on the phase relationship between the incoming signal and the reference signal. That is, as the input signal leads in phase the potential at point A decreases and as the input signal lags in phase the D.C. potential at point A increases. For open loop response, the increase and decrease are with respect to zero potential. However, when the reference oscillator is connected in a closed loop, the D.C. potential at point A stabilizes at a steady state value of about −5.7 volts for a pre-selected normal operating frequency (about 2KHZ) and when using the bias levels shown in FIG. 3. It should be particularly noted, however, that the D.C. level at point A will float and therefore allow the system to follow any frequency or phase shift of the incoming binary carrier signal. This is to be distinguished from conventional systems which require the locking of the receiver's internally generated demodulation signal to a transmitted reference signal and not to the binary information carrier signal alone.

Referring now to oscillator circuit 15 of FIG. 3, the voltage at point A of phase shift discriminator 13 is applied to the base of field effect transistor 41 of reference oscillator circuit 15. The amplified output of transistor 41 is applied through resistors 43 and 45, respectively, to the bases of transistors 47 and 49 of the astable multivibrator 50 of reference oscillator 15. Multivibrator 50 includes resistors 43, 45, 51, 53 and capacitors 55, 57. From this it can be seen that the frequency of the astable multivibrator is dependent upon the potential at point A of phase shift discriminator 13. The output of the astable multivibrator is connected to the base of emitter follower transistor 59 through D.C. blocking capacitor 61. The output of transistor 59 is applied to the input of low pass filter circuit 63 including resistors 65, 67 and capacitors 69 and 71.

The above described closed loop circuit establishes the frequency and phase lock within approximately 3 milliseconds after the frequency or phase change occurs. Thus the reference oscillator is locked in both frequency and phase in sufficient time to detect the next bit of information of the transmitted binary signal which occurs at a minimum time interval of about 22 milliseconds for teletype signals. The field effect transistor 41 provides high impedence and good isolation between phase shift discriminator 13 and reference oscillator 15. The emitter follower transistor 59 provides impedence matching between the astable multivibrator and the low pass filter.

It should be noted that the time response of the phase shift discriminator 13 is quite rapid. Therefore, not only does the D.C. level of point A gradually rise and fall as shown in curve A of FIG. 2, due to the Doppler effect, for example, but the D.C. level at point A also rises and falls very rapidly according to the binary information contained in the incoming carrier signal as shown by signal 23 in curve A of FIG. 2.

The signal at point A of phase shift discriminator 13 is also applied to the base of emitter follower transistor 75 of trigger circuit 17 of FIG. 3. The output of transistor 75 is filtered by a 2KHZ trapping circuit, including inductor 77 and capacitor 79, to eliminate undesired oscillations at the input to the trigger circuit. These oscillations occur from the use of the trigger circuit. These oscillations occur from the use of the RC filter in the reference oscillator circuit. The trigger circuit includes transistors 81, 83 and resistors 85, 87, 89, 91 and 93. This trigger circuit provides an output as illustrated in curve B of FIG. 2. The trigger circuit is designed for an input signal of −4.7 volts to turn the output (the collector of transistor 83) to the low state, the least negative voltage, and a signal voltage of −7.7 volts to turn the output to the high state, the more negative voltage. The quiescent point of the trigger circuit is about −5.8 volts. This is the potential at point A of phase shift discriminator 13 when the reference oscillator has locked in phase with the input signal at a frequency of 2KHZ. This enables a symetrical deviation from the quiescent point of the input signal. The output signal from the trigger circuit is applied to the base of transistor 95, connected as a grounded emitter, to invert the signal as shown in curve C of FIG. 2. This signal is then applied through capacitor 97 to the input of teletype machine 21 of FIG. 1.

What is claimed is:

1. A detector system for processing information contained in a carrier signal comprising:

a. a phase shift discriminator;

b. a reference oscillator providing a reference signal output;

c. said phase shift discriminator including a transformer having a primary winding and a secondary winding, said carrier signal being applied to said primary winding, said secondary winding being center tapped and said reference signal being directly connected between said center tap and ground;

d. said phase shift discriminator including first and second diodes and a capacitance-resistance network, the anode of said first diode being connected to one end of said secondary winding, the cathode of said second diode being connected to the other end of said secondary winding; said capacitance-resistance network including first, second and third resistors and first and second capacitors, one end of each of said first, second and third resistors being interconnected, the other end of said first resistor being operatively connected to the cathode of said first diode, the other end of said second resistor being operatively connected to the anode of said second diode, the other end of said third resistor being operatively connected to one side of said first capacitor and to one side of said second capacitor, the other side of said first capacitor being connected to the cathode of said first diode and the other side of said second capacitor being connected to the anode of said second diode;

e. said phase shift discriminator providing a D.C. output signal at the interconnection point of said first, second and third resistors the level of which is dependent upon the degree of out-of-phase relationship between said carrier signal and said reference signal;

f. said reference oscillator including voltage responsive means for varying the frequency thereof;

g. said D.C. output signal of said phase shift discriminator being operatively connected to said voltage responsive means of said reference oscillator; and whereby h. changes in phase relationship between said carrier signal and said reference signal result in changes in frequency of said reference oscillator such that the output of said reference oscillator is initially frequency locked to the carrier signal and then phase locked to the carrier signal.

2. The device of claim 1 including:

a. a field effect transistor;

b. the D.C. output of said phase shift discriminator being operatively connected to the base of said field effect transistor; and c. the output of said field effect transistor being operatively connected to said voltage responsive means of said reference oscillator.

3. The device of claim 2 including:

a. a low-pass R-C filter circuit;

b. the output of said reference oscillator being operatively connected to the input of said low pass filter circuit; and c. the output of said low pass filter circuit being operatively connected to the center tap of said secondary winding.

4. The device of claim 3 including:

a. an inverter circuit;

b. a trapping circuit;

c. the D.C. output of said phase shift discriminator being operatively connected to the input of said trapping circuit; and d. the output of said trapping circuit being operatively connected to the input of said inverter circuit.

* * * * *